US007431875B2

(12) United States Patent
Rule (10) Patent No.: US 7,431,875 B2
(45) Date of Patent: Oct. 7, 2008

(54) PROCESS OF PREPARING A UNITIZED MEMBRANE ELECTRODE ASSEMBLY USING COMPRESSION MOLDING

(75) Inventor: David P. Rule, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 887 days.

(21) Appl. No.: 10/498,028

(22) PCT Filed: Jan. 22, 2003

(86) PCT No.: PCT/US03/01795

§ 371 (c)(1),
(2), (4) Date: Jun. 7, 2004

(87) PCT Pub. No.: WO03/061931

PCT Pub. Date: Jul. 31, 2003

(65) Prior Publication Data
US 2005/0252603 A1 Nov. 17, 2005

(51) Int. Cl.
*B29C 43/18* (2006.01)
(52) U.S. Cl. .................. 264/272.14; 264/272.15; 264/272.21; 264/275; 425/406; 425/411
(58) Field of Classification Search ............... None
See application file for complete search history.

(56) References Cited

U.S. PATENT DOCUMENTS

| 1,653,600 | A | * | 12/1927 | Dam | ............ 429/162 |
| 1,739,784 | A | * | 12/1929 | Dam | ............ 429/162 |
| 2,307,371 | A | * | 1/1943 | Hileman | ............ 264/28 |
| 2,393,267 | A | * | 1/1946 | Robie et al. | ............ 51/297 |
| 2,527,373 | A | * | 10/1950 | Parson | ............ 361/308.1 |
| 3,213,491 | A | * | 10/1965 | Craig | ............ 425/78 |
| 3,611,517 | A | * | 10/1971 | Giersberg et al. | ............ 425/346 |
| 3,627,861 | A | * | 12/1971 | Timke | ............ 264/680 |
| 3,797,986 | A | * | 3/1974 | Onder | ............ 425/352 |
| 4,708,613 | A | * | 11/1987 | Sera et al. | ............ 425/117 |
| 5,187,025 | A | | 2/1993 | Kelland et al. | |
| 5,378,416 | A | | 1/1995 | Kishi et al. | |
| 6,569,372 | B1 | * | 5/2003 | Saito et al. | ............ 264/325 |
| 2003/0030185 | A1 | * | 2/2003 | Gemberling | ............ 264/325 |
| 2003/0068542 | A1 | * | 4/2003 | Harada et al. | ............ 429/34 |
| 2004/0028959 | A1 | * | 2/2004 | Horiuchi et al. | ............ 429/12 |

FOREIGN PATENT DOCUMENTS

EP 0818290 B1 9/2002
EP 1156546 B1 10/2003

OTHER PUBLICATIONS

JP04179061, Patent Abstracts of Japan, Published Jun. 25, 1992, Mitsubishi Heavy Ind Ltd.
JP11045729, Patent Abstracts of Japan, Published Feb. 16, 1999, Fuji Electric Co Ltd.
International Search Report, International Application No. PCT/US03/01795, International Filing Date: Jan. 22, 2003.

* cited by examiner

*Primary Examiner*—Edmund H. Lee (57) ABSTRACT

The invention provides a mold for use in a compression molding apparatus that has a frame part (41) with a hole through its center; a bottom plunger (42); and a top plunger (43); wherein the plungers are fabricated to fit substantially snugly in the hole in the frame part, and wherein at least one plunger comprises at least one low-thermal conductivity insert (44, 44'). The mold is useful in compression molding processes used in the preparation of unitized membrane electrodes.

14 Claims, 3 Drawing Sheets

PROCESS OF PREPARING A UNITIZED MEMBRANE ELECTRODE ASSEMBLY USING COMPRESSION MOLDING

FIELD OF THE INVENTION

This invention relates to a mold for use in compression molding, and more particularly to the preparation of a unitized membrane electrode assembly having fluid impermeable polymer seal that is prepared using compression molding.

BACKGROUND OF THE INVENTION

A variety of electrochemical cells falls within a category of cells often referred to as solid polymer electrolyte ("SPE") cells. An SPE cell typically employs a membrane of a cation exchange polymer that serves as a physical separator between the anode and cathode while also serving as an electrolyte. SPE cells can be operated as electrolytic cells for the production of electrochemical products or they may be operated as fuel cells.

Fuel cells are electrochemical cells that convert reactants, namely fuel and oxidant fluid streams, to generate electric power and reaction products. A broad range of reactants can be used in fuel cells and such reactants may be delivered in gaseous or liquid streams. For example, the fuel stream may be substantially pure hydrogen gas, a gaseous hydrogen containing reformate stream, or an aqueous alcohol, for example methanol in a direct methanol fuel cell (DMFC). The oxidant may, for example, be substantially pure oxygen or a dilute oxygen stream such as air.

In SPE fuel cells, the solid polymer electrolyte membrane is typically perfluorinated sulfonic acid polymer membrane in acid form. Such fuel cells are often referred to as proton exchange membrane ("PEM") fuel cells. The membrane is disposed between and in contact with the anode and the cathode. Electrocatalysts in the anode and the cathode typically induce the desired electrochemical reactions and may be, for example, a metal black, an alloy or a metal catalyst supported on a substrate, e.g., platinum on carbon. SPE fuel cells typically also comprise a porous, electrically conductive sheet material that is in electrical contact with each of the electrodes, and permit diffusion of the reactants to the electrodes. In fuel cells that employ gaseous reactants, this porous, conductive sheet material is sometimes referred to as a gas diffusion backing and is suitably provided by a carbon fiber paper or carbon cloth. An assembly including the membrane, anode and cathode, and gas diffusion backings for each electrode, is sometimes referred to as a membrane electrode assembly ("MEA"). Bipolar plates, made of a conductive material and providing flow fields for the reactants, are placed between a number of adjacent MEAs. A number of MEAs and bipolar plates are assembled in this manner to provide a fuel cell stack.

In fabricating unitized MEAs, multilayer MEAs may be sealed using a fluid impermeable polymer seal. Several techniques may be used to form these seals, including compression molding and injection molding. With injection molding, the sealing polymer that is used as the sealant material is applied in liquid or slurry form and this is associated with its own disadvantages. In injection molding, the sealing polymer sometimes does not flow onto both sides of the membrane, and the relatively high pressures and flow velocities may damage the gas diffusion backings. Balancing the pressures on all edges of the gas diffusion backings may be difficult. Another disadvantage of injection molding is the difficulty of maintaining the position of the components of the MEA in the mold. Clamping force on the components must be great enough to impede motion due to the injection pressure and may damage the fibers in the gas diffusion backing, creating debris and possible shorting of the MEA if the debris punctures the membrane. Since compression molding does not involve high-pressure gradients and flow velocities, it does not generally have these problems.

A need exists for a mold useful in compression molding, wherein membranes that are substantially dimensionally unstable are used, that does not result in a damaged unitized MEA because of the application of heat in the compression molding process.

SUMMARY OF THE INVENTION

In a first aspect, the invention provides a mold for use in compression molding comprising:
  (a) a frame part with a hole through its center;
  (b) a bottom plunger; and
  (c) a top plunger; wherein the plungers are fabricated to fit substantially snugly in the hole in the frame part, and wherein at least one plunger comprises at least one low-thermal conductivity insert.

In the first aspect, both plungers may be provided with at least one low-thermal conductivity insert. Further, a plurality of plungers may be used instead of a single plunger.

In a second aspect, the invention provides a process of preparing a unitized membrane electrode assembly using compression-molding comprising:
  (a) forming a multilayer sandwich comprising a first gas diffusion backing having sealing edges; a first electrocatalyst coating composition; a polymer membrane; a second electrocatalyst coating composition; and a second gas diffusion backing having sealing edges; and
  (b) compression molding a sealing polymer to the multilayer sandwich, wherein the mold used in the compression molding process comprises:
  (c) a frame part with a hole through its center;
  (d) a bottom plunger; and
  (e) a top plunger; wherein the plungers are fabricated to fit substantially snugly in the hole in the frame part, and wherein at least one plunger comprises at least one low-thermal conductivity insert;

whereby the sealing polymer is impregnated into the sealing edges of the first and second gas diffusion backings, and the sealing polymer envelops a peripheral region of both the first and second gas diffusion backings and the polymer membrane to form a polymer, fluid impermeable seal. The sealing polymer may be a thermosetting or curable resin polymer or a thermoplastic polymer.

DETAILED DESCRIPTION OF THE INVENTION

Compression Molding

The compression-molding apparatus consists of a mold (40) and a heated press (not shown). The picture-frame mold (40) is fabricated of a material having high thermal conductivity and chosen to withstand the elevated temperatures of the process. Typically, a metal such as tool steel or aluminum may be used. Some examples of metals that are useful include metals having American Iron and Steel Institute (AISI) specifications of H-13, H-19, P-4, P-5, and P-6. Some additional materials may include 400 series steels such as AISI 410, 416, 420, 431 and 400. Some useful types of aluminum include Aluminum Association (AA) designations AA 5086, AA 5454, AA 2024, and AA 7075.

Figure 1:
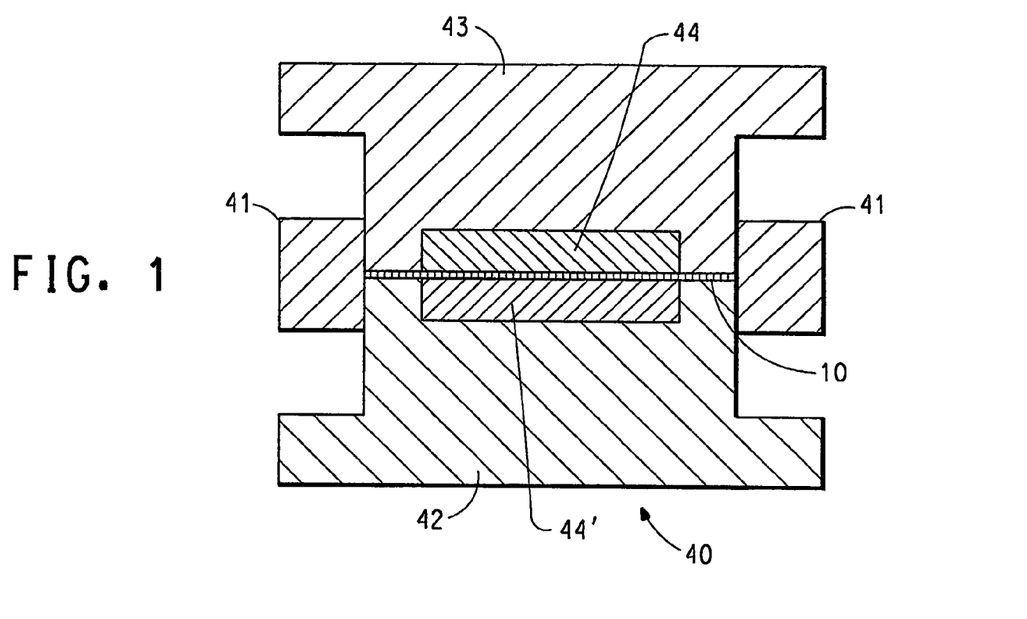
FIG. 1 is a schematic illustration of a mold (40) used in compression molding showing the positioning of low-thermal conductivity inserts 44 and 44'.
Figure 2:
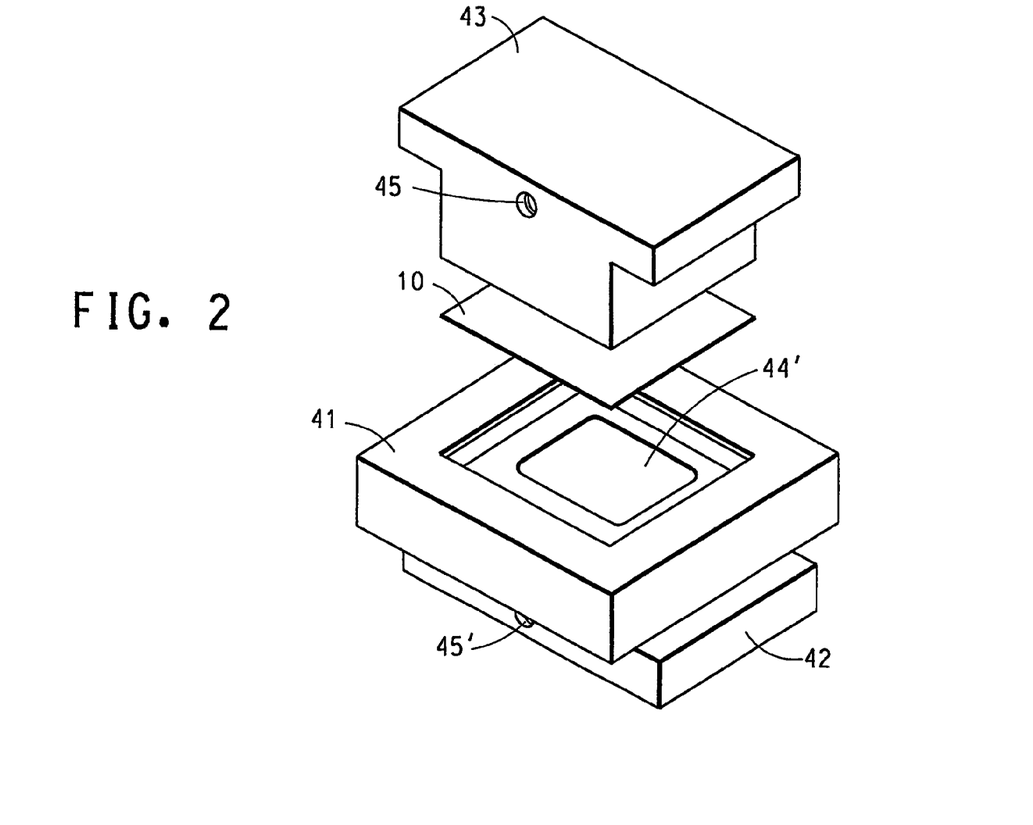
FIG. 2 is a schematic illustration of a expanded view of the mold (40).

As shown in FIGS. 1 and 2, the mold (40) generally consists of three parts—a frame part with a hole through its center (41), a bottom plunger (42), and a top plunger (43). The plungers are fabricated to fit snuggly into the frame, and one of the plungers, typically the bottom plunger (42), may actually be integral with it. Typically, a hole (45) or (45') is provided in the frame or plungers where a thermocouple may be inserted for the purpose of monitoring the sealing polymer temperature.

Figure 3:
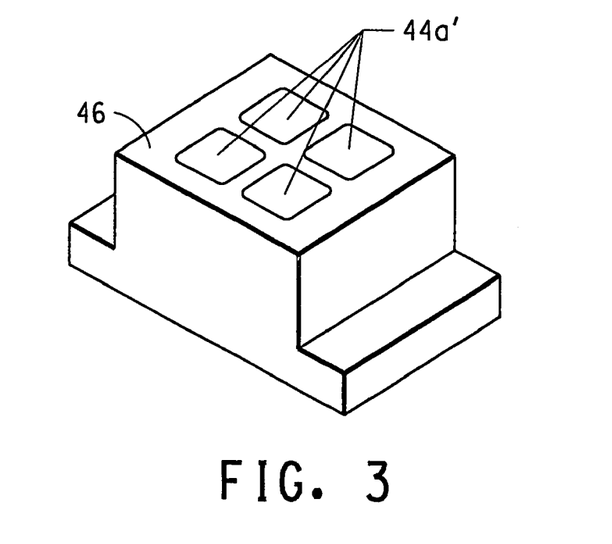
FIG. 3 is a schematic illustration of plungers (42) or (43) showing more than one insert in the same plunger.

The plungers are typically to be heated and cooled at the same rate in order to minimize warping of the product part. In one embodiment, this can be most readily achieved by making their masses essentially equal. Since the polymer membrane (11), such as an ion exchange membrane, that is used to make the membrane electrode assembly is substantially dimensionally unstable, it is important that the plungers be kept cooler in their centers than at their periphery to prevent it from degrading or wrinkling. Plungers made with low-thermal conductivity inserts (44) and (44') in their central areas can achieve this, as the center of the mold may be insulated from the heat of the press, and therefore remain at a lower temperature than the metal parts throughout the process. Alternately, as shown in FIG. 3, the insert may be made up of a plurality of smaller inserts (44a') with the proviso that the amount of metal kept in contact with the membrane electrode assembly is sufficiently low so warping resulting from the metal contact is minimized. Any material may be used as the inserts (44) and (44') with the proviso that they keep the MEA components at a lower temperature. Some useful materials include ceramics selected from the group consisting of alumina, alumina silicate, glass, zirconia, and boron nitride. Some useful ceramic materials may be purchased from Cotronics Corporation, Brooklyn, N.Y., e.g. glass ceramics; Corning, Inc., Corning, N.Y., e.g. ceramics sold under the tradename Macor®; Maryland Lava Company, Street, Md., and Hottec, Inc., Norwich, Conn., e.g. cementous aluminate materials sold under the tradename Fabcram®. Adhesives may be used to bond the inserts in place. Some useful adhesives in fast cure adhesives such as Zircon® adhesives, and the Resbond™ family of adhesives from Cotronics Corporation, Brooklyn, N.Y. After bonding with the plunger the face of the plunger (46) is then polished so the insert is flush with the surface (46) of the plunger (42) or (43).

Membrane Electrode Assembly

Figure 4:
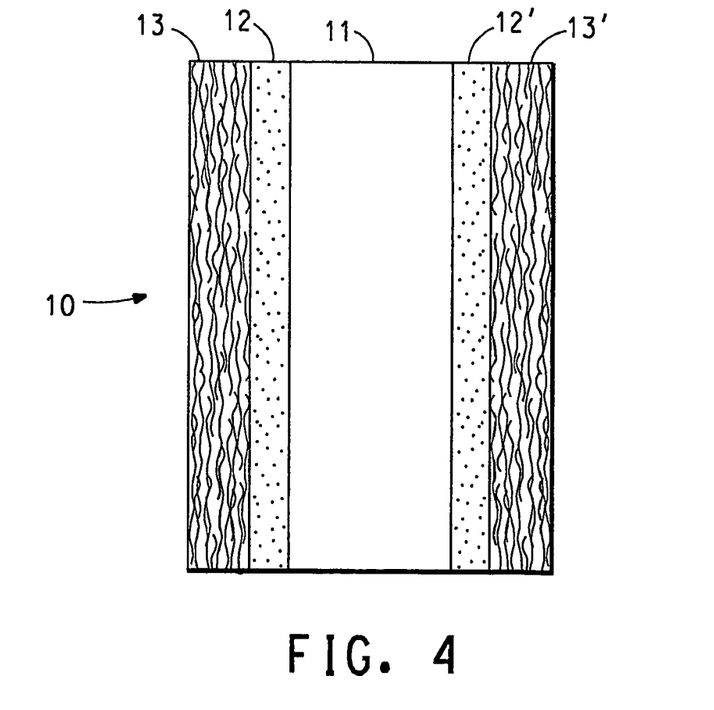
FIG. 4 is a schematic illustration of a multilayer sandwich (10) comprising a first gas diffusion backing having sealing edges (13); a first electrocatalyst coating composition (12); a polymer membrane (11); a second electrocatalyst coating composition (12'); and a second gas diffusion backing having sealing edges (13') used to form the membrane electrode assembly (MEA)

The unitized MEA is prepared using a multilayer sandwich (10), shown in FIG. 4, comprising a first gas diffusion backing having sealing edges (13); a first electrocatalyst coating composition (12); a polymer membrane (11); a second electrocatalyst coating composition (12'); and a second gas diffusion backing having sealing edges (13'). The unitized MEA also comprises a polymer fluid impermeable seal (14), shown in FIGS. 5 and 6, wherein the sealing polymer is either a thermoplastic polymer or a thermosetting or curable resin, and wherein the sealing polymer is impregnated into the at least a portion of the sealing edges of the first and second gas diffusion backings (13) and (13'), and the seal envelops a peripheral region of both the first and second gas diffusion backings (13) and (13'), and the polymer membrane (11).

Gas Diffusion Backing

The gas diffusion backings having sealing edges (13) and (13') include a porous electrically conductive material, typically having an interconnected pore or void structure. Typically, the sealing edge of the gas diffusion backing is the cut edge. The electrically conductive material typically comprises a corrosion-resistant material such as carbon, which may be formed into fibers. Such fibrous carbon structures may be in the form of a paper, woven fabric, or nonwoven web. Alternatively, the electrically conductive material may be in particle form. Mixtures of the fibrous carbon structures and the electrically conductive material in particulate form may be used. The electrically conductive material may further be optionally surface-treated to either increase or decrease its surface energy, allowing it to have either increased or decreased hydrophobicity.

A binder is optionally used to provide the structure with desired mechanical properties such as strength or stiffness. The binder itself may be chosen to serve the additional purpose of a surface treatment as mentioned above.

A microporous composition may also be optionally included with one or both of the gas diffusion backings. This composition may be located on one or both surfaces of the gas diffusion backing or impregnated into it or both. It serves, among other purposes, to afford electrical and/or fluid contact on a fine scale with the electrocatalyst coating. It may further enhance the ability of the gas diffusion backing to permit two-phase fluid flow during fuel cell operation, such as shedding liquid water in the cathode oxidant stream or shedding carbon dioxide bubbles in the anode stream of a direct-methanol fuel cell. It typically comprises electrically conductive particles and a binder. The particles may be, for example, high-structure carbon black such as Vulcan® XC72 manufactured by Cabot Corporation, or acetylene carbon black. The binder may be, for example, a polymer such as Teflon® polytetrafluoroethylene manufactured by DuPont.

First and Second Electrocatalyst Coating Compositions:

The electrocatalyst coating compositions (12) and (12') include an electrocatalyst and an ion exchange polymer; the two coating compositions may be the same or different. The ion exchange polymer may perform several functions in the resulting electrode including serving as a binder for the electrocatalyst and improving ionic conductivity to catalyst sites. Optionally, other components are included in the composition, e.g., PTFE in particle form.

Electrocatalysts in the composition are selected based on the particular intended application for the catalyst layer. Electrocatalysts suitable for use in the present invention include one or more platinum group metal such as platinum, ruthenium, rhodium, and iridium and electroconductive oxides thereof, and electroconductive reduced oxides thereof. The catalyst may be supported or unsupported. For direct methanol fuel cells, a $(Pt—Ru)O_X$ electocatalyst has been found to be useful. One particularly preferred catalyst composition for hydrogen fuel cells is platinum on carbon, for example, 60-wt % carbon, 40-wt % platinum, obtainable from E-Tek Corporation of Natick, Mass. These compositions when employed accordance with the procedures described herein, provided particles in the electrode which are less than 1 µm in size.

Since the ion exchange polymer employed in the electrocatalyst coating composition serves not only as binder for the electrocatalyst particles but also may assist in securing the electrode to the membrane, it is preferable for the ion exchange polymers in the composition to be compatible with the ion exchange polymer in the membrane. Most preferably, exchange polymers in the composition are the same type as the ion exchange polymer in the membrane.

Ion exchange polymers for use in accordance with the present invention are preferably highly fluorinated ion-exchange polymers. "Highly fluorinated" means that at least 90% of the total number of univalent atoms in the polymer are fluorine atoms. Most preferably, the polymer is perfluorinated. It is also preferred for use in fuel cells for the polymers to have sulfonate ion exchange groups. The term "sulfonate ion exchange groups" is intended to refer to either sulfonic acid groups or salts of sulfonic acid groups, preferably alkali metal or ammonium salts. For applications where the polymer is to be used for proton exchange as in fuel cells, the sulfonic acid form of the polymer is preferred. If the polymer in the electrocatalyst coating composition is not in sulfonic acid form when used, a post treatment acid exchange step will be required to convert the polymer to acid form prior to use.

Preferably, the ion exchange polymer employed comprises a polymer backbone with recurring side chains attached to the backbone with the side chains carrying the ion exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride ($—SO_2F$), which can be subsequently hydrolyzed to a sulfonate ion exchange group. For example, copolymers of a first fluorinated vinyl monomer together with a second fluorinated vinyl monomer having a sulfonyl fluoride group ($—SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain that does not interfere with the ion exchange function of the sulfonate ion exchange group. Additional monomers can also be incorporated into these polymers if desired.

Especially preferred polymers for use in the present invention include a highly fluorinated, most preferably perfluorinated, carbon backbone with a side chain represented by the formula $—(O—CF_2CFR_f)_a—O—CF_2CFR'_fSO_3H$, wherein $R_f$ and $R'_f$ are independently selected from F, Cl or a perfluorinated alkyl group having 1 to 10 carbon atoms, a=0, 1 or 2. The preferred polymers include, for example, polymers disclosed in U.S. Pat. No. 3,282,875 and in U.S. Pat. Nos. 4,358,545 and 4,940,525.

The electrocatalyst coating or catalyst layer may be formed from a slurry or ink. The liquid medium for the ink is one selected to be compatible with the process of application. The inks may be applied to the membrane by any known technique to form a catalyst-coated membrane. Alternately, the inks may be applied to the gas diffusion backing. Some known application techniques include screen, offset, gravure, flexographic or pad printing, or slot-die, doctor-blade, dip, or spray coating. It is advantageous for the medium to have a sufficiently low boiling point that rapid drying of electrode layers is possible under the process conditions employed. When using flexographic or pad printing techniques, it is important that the composition not dry so fast that it dries on the flexographic plate or the cliché plate or the pad before transfer to the membrane film.

A wide variety of polar organic liquids or mixtures thereof can serve as suitable liquid media for the ink. Water in minor quantity may be present in the medium if it does not interfere with the printing process. Some preferred polar organic liquids have the capability to swell the membrane in large quantity although the amount of liquids the electrocatalyst coating composition applied in accordance with the invention is sufficiently limited that the adverse effects from swelling during the process are minor or undetectable. It is believed that solvents with the capability to swell the polymer membrane can provide better contact and more secure application of the electrode to the membrane. A variety of alcohols are well suited for use as the liquid medium.

Preferred liquid media include suitable C4 to C8 alkyl alcohols including, n-, iso-, sec- and tert-butyl alcohols; the isomeric 5-carbon alcohols, 1,2- and 3-pentanol, 2-methyl-1-butanol, 3-methyl, 1-butanol, etc., the isomeric 6-carbon alcohols, e.g. 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc., the isomeric C7 alcohols and the isomeric C8 alcohols. Cyclic alcohols are also suitable. Preferred alcohols are n-butanol and n-hexanol. Most preferred is n-hexanol.

If the polymer in the electrocatalyst coating composition is not in sulfonic acid form when used, a different liquid medium may be preferred in the ink. For example, if the one of the preferred polymers described above has its sulfonated groups in the form of sulfonyl fluoride, a preferred liquid medium is a high-boiling fluorocarbon such as "Fluorinert" FC-40 manufactured by 3M.

Handling properties of the ink, e.g. drying performance, can be modified by the inclusion of compatible additives such as ethylene glycol or glycerin up to 25% by weight based on the total weight of liquid medium.

It has been found that the commercially available dispersion of the acid form of the perfluorinated sulfonic acid polymer, sold by E.I. du Pont de Nemours and Company under the trademark Nafion®, in a water/alcohol dispersion, can be used, as starting material, for the preparation of an electrocatalyst coating composition suitable for use in flexographic or pad printing.

In the electrocatalyst coating composition, it is preferable to adjust the amounts of electrocatalyst, ion exchange polymer and other components, if present, so that the electrocatalyst is the major component by weight of the resulting electrode. Most preferably, the weight ratio of electrocatalyst to ion exchange polymer in the electrode is about 2:1 to about 10:1.

Utilization of the electrocatalyst coating technique in accordance with the process of the present invention can produce a wide variety of printed layers which can be of essentially any thickness ranging from very thick, e.g., 20 µm or more very thin, e.g., 1 µm or less. This full range of thickness can be produced without evidence of cracking, loss of adhesion, or other inhomogenieties. Thick layers, or complicated multi-layer structures, can be easily achieved by utilizing the pattern registration available using flexographic or pad printing technology to provide multiple layers deposited onto the same area so that the desired ultimate thickness can be obtained. On the other hand, only a few layers or perhaps a single layer can be used to produce very thin electrodes. Typically, a thin layer ranging from 1 to 2 µm may be produced with each printing with lower % solids formulations. Some typical electrostatic coating compositions or inks are disclosed in U.S. Pat. No. 5,330,860.

The multilayer structures mentioned above permit the electrocatalyst coating to vary in composition, for example the concentration of precious metal catalyst can vary with the distance from the substrate, e.g. membrane, surface. In addition, hydrophilicity can be made to change as a function of coating thickness, e.g., layers with varying ion exchange polymer EW can be employed. Also, protective or abrasion-resistant top layers may be applied in the final layer applications of the electrocatalyst coating.

Composition may also be varied over the length and width of the electrocatalyst coated area by controlling the amount applied as a function of the distance from the center of the application area as well as by changes in coating applied per pass. This control is useful for dealing with the discontinuities that occur at the edges and corners of the fuel cell, where activity goes abruptly to zero. By varying coating composition or plate image characteristics, the transition to zero activity can be made gradual. In addition, in liquid feed fuel cells, concentration variations from the inlet to the outlet ports can be compensated for by varying the electrocatalyst coating across the length and width of the membrane.

Polymer Membrane:

A polymer membrane (11), for use in accordance with the invention, can be made of the same ion exchange polymers discussed above for use in the electrocatalyst coating compositions. The membranes can be made by known extrusion or casting techniques and have thickness which can vary depending upon the application and typically have a thickness of about 350 µm or less. The trend is to employ membranes that are quite thin, i.e., about 50 µm or less. The process in accordance with the present in invention is well-suited for use in forming electrodes on such thin membranes where the problem associated with large quantities of solvent during coating are especially pronounced. While the polymer may be in alkali metal or ammonium salt form during the flexographic or pad printing process, it is preferred for the polymer in the membrane to be in acid form to avoid post treatment acid exchange steps. Suitable perfluorinated sulfonic acid polymer membranes in acid form are available under the trademark Nafion® by E.I. du Pont de Nemours and Company. Alternatively, membranes made from a variety of other ion-conducting polymers could be used, for example sulfonated polyaromatics as described in World Patent WO 00/15691.

Reinforced perfluorinated ion exchange polymer membranes can also be utilized in catalyst coated membrane (CCM) manufacture by the inventive printing process. Reinforced membranes can be made by impregnating porous, expanded PTFE (ePTFE) with ion exchange polymer. Expanded PTFE is available under the tradename "Goretex" from W. L. Gore and Associates, Inc., Elkton Md., and under the tradename "Tetratex" from Tetratec, Feasterville Pa. Impregnation of ePTFE with perfluorinated sulfonic acid polymer is disclosed in U.S. Pat. Nos. 5,547,551 and 6,110,333.

Catalyst coated membranes or gas diffusion backings coated with electrocatalyst coating compositions may be provided with post treatments such as calendering, vapor treatment to affect water transport, or liquid extraction to remove trace residuals from any of the above earlier steps. If the membrane dispersion or solution used was the precursor of the highly fluorinated ionomer, after application of the solution or dispersion the sandwich formed may be subjected to a chemical treatment to convert the precursor to the ionomer.

Sealing Polymer

Figure 5:
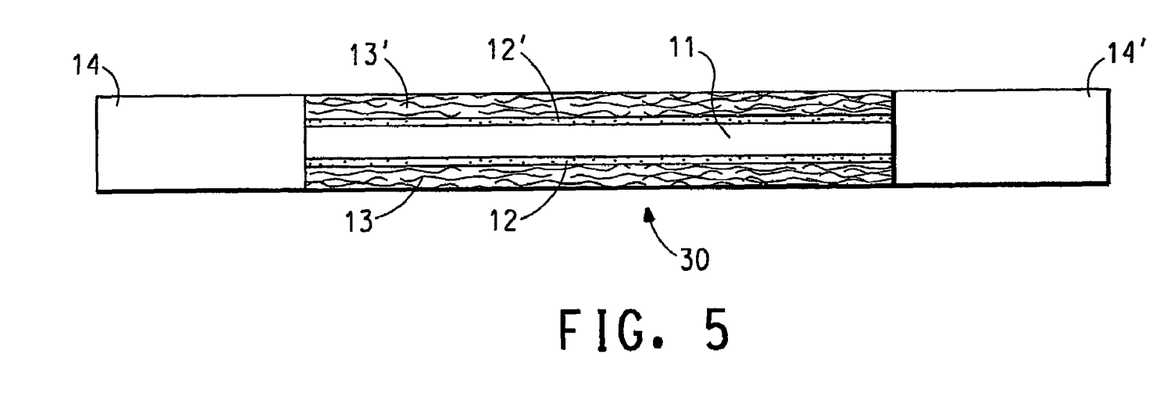
FIG. 5 is a schematic illustration of a unitized MEA (30) after its removal from the mold in the compression molding process.
Figure 6:
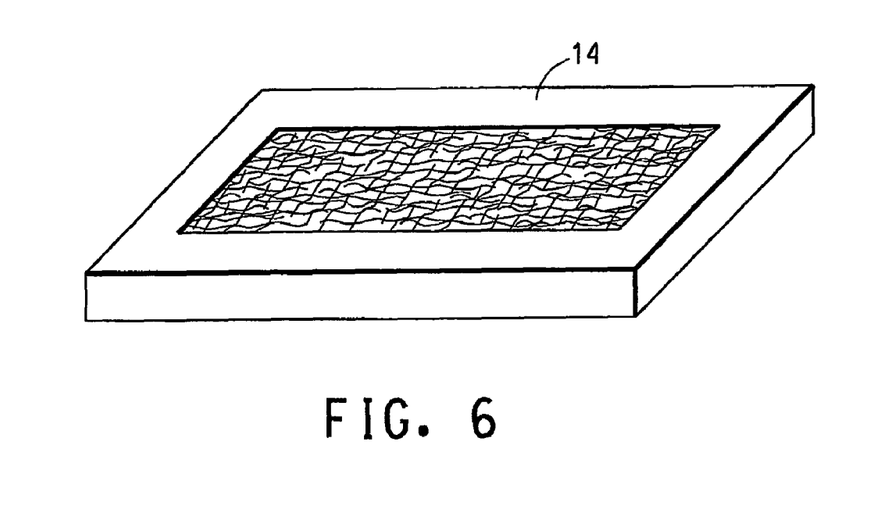
FIG. 6 is a schematic illustration of an oblique view of a unitized MEA (30) after its removal from the mold in the compression molding process.

Thermosetting or thermoplastic polymers may be used as the sealing polymer. FIG. 5 is a schematic illustration of a unitized MEA (30) after its removal from the mold in the compression molding process.

Thermoplastic polymers are "materials that soften and flow upon application of pressure and heat. Thus, most thermoplastic materials can be remolded many times. The obvious advantage is that a piece that is rejected or broken after molding can be ground up and remolded. In case of a mis-molded part, thermoplastic materials also offer the option of repair through application of heat. Some techniques for this include, for example, contact heating, infrared energy, and ultrasonic welding. The presence of electrical conductors in a fuel cell also offers the possibility of electrical resistance or induction welding to re-melt and re-form a thermoplastic component.

Chemically, thermoplastic processing is essentially inert, with very low emissions and little or no appreciable chemical reaction-taking place. Thus, problems such as environmental impact, worker exposure, and bubble formation in the parts are minimal. Thermoplastics as a class include some of the most chemically inert materials in common usage, such as fluoropolymers and aromatic poly(ether ketone)s. Such sealing polymers are available with extremely low levels of any potential fuel cell contaminants, such as metals, catalysts, and reactive functional groups.

Thermoplastic polymers offer a wide range of physical properties of interest to the fuel cell designer. Semicrystalline forms such as high-density polyethylene and polyvinylidene fluoride have particularly low permeability to gases and liquids, and high mechanical toughness. Many have high compressive moduli, either in the neat or reinforced forms, and so can be used to rigidly support fuel cell stack pressure without significantly changing the MEA thickness. Finally, thermoplastics such as melt-processible fluoropolymers offer very durable electrical properties, including dielectric strength and electrical resistance.

One of the most significant advantages for thermoplastics in this application is their flow properties. In the process of injection molding, the mold and MEA are held below the melt temperature of the injected sealing polymer as it is introduced. The sealing polymer solidifies almost instantly upon contact with these relatively cool surfaces, and additional sealing polymer continues to flow past these areas in the interior of the cavity only. As this material reaches the flow front, it spreads apart, contacts cooler surface, and solidifies there. This phenomenon, referred to as "fountain flow" in polymer-processing literature, offers a unique advantage for thermoplastics in this invention. The spreading-apart effect tends to separate electrodes that were initially in or near short-circuit contact. Further, the rapid solidification on contact with the MEA layers tends to prevent sealing off of the catalyst layers. The electrode-separating action of thermoplastic flow has been clearly seen in the products of this invention through microscopic examination.

The thermoplastic polymers useable in this invention may be from any of a number of classes. Melt-processible fluoropolymers such as DuPont Teflon® FEP 100 and DuPont Teflon® PFA 340 may be used, as well as partially fluorinated polymers, an example being polyvinylidene fluoride such as Kynar® 710 and Kynar Flex® 2801 manufactured by Atofina Chemicals, King of Prussia, Pa. Thermoplastic fluoroelastomers such as Kalrez® and Viton®, manufactured by E. I. Du Pont de Nemours & Company, Inc., Wilmington, Del., also fall into this class. Aromatic condensation polymers such as polyaryl(ether ketone)'s, an example being polyaryl(ether ether ketone) manufactured by Victrex Manufacturing Limited, Lancashire, Great Britain; modified polyethylene such as Bynel® 40E529, modified polypropylene such as Bynel® 50E561, both manufactured by DuPont; polyethylene such as Sclair® 2318 manufactured by NOVA Chemicals Corporation, Calgary, Alberta, Canada; thermoplastic elastomers such as Hytrel® (DuPont); liquid-crystal polymers such as Zenite® liquid-crystal polyester (DuPont), and aromatic polyamides such as Zytel® HTN (DuPont) can also be used. Thermosetting materials are materials that, once heated, react irreversibly so that subsequent applications of heat and pressure do not cause them to soften and flow. Thermoplastic polymers are preferred over thermosetting materials because a rejected or scrapped piece prepared with a thermosetting material cannot be ground up and remolded. Some examples of thermosetting materials include epoxies, urethane resins, and vulcanized natural rubber.

The sealing polymer may also be optionally reinforced with fibers, fabrics, or inorganic fillers, which may either be placed in the mold during the compression molding process or compounded into the sealing polymer beforehand. Such reinforcements can reduce warpage in the final part.

Process

The multilayer MEA sandwich (10) is placed in the center of the bottom plunger (42) with the frame part (41) around it. The plunger may have a release surface or be optionally coated or lined with a release agent, such as PTFE film, to allow easy removal of the part after molding. The CCM or membrane is typically cut to be larger than the gas diffusion backings. Several layers of the sealing polymer film are cut to the shape of a frame to surround the gas diffusion backings (13) and (13') but partly overlap the extended portion of the membrane (11) all around its perimeter. Alternatively, the sealing polymer may be introduced to the process in a number of other forms, including powders, strips, fibers, fabric, liquid, or paste. It is preferable that it be introduced in a precisely metered manner, such as a die-cut film of controlled thickness or a metering pump with robotic control for a liquid. The sealing polymer is placed in the mold, above and below the membrane but surrounding the gas diffusion backings. As with the bottom plunger (42), the top plunger (43) may have a release surface or be optionally coated or lined with a release agent, such as PTFE film.

The top plunger (43) of the tool is put in place, fitted into the frame part (41). The tool (40) with the materials within is put in a press, allowed to heat to above the melting point of the sealing polymer, compressed by mechanical action of the press, for example hydraulically, and cooled in place. The press may be heated on only one side in which case on the plunger on the side that is heated needs a low-thermal conductivity insert. Any press suitable for heating and melting the thermoplastic seal material may be used in this invention. Some known presses include presses from Carver Inc., Wabash, Ind.; PHI, City Of Industry, Calif.; and Johnson Machinery Company, Bloomfield, N.J. A shim (not shown) may be placed on the frame between the top plunger and the frame to determine the extent to which the MEA components are compressed. If a shim is not used a compression pressure of about 0.1 to about 10 MPa, more typically a compression pressure of about 2 to about 3 MPa may be used. The sealing polymer is preferably heated to just the point of complete melting throughout before cooling is initiated. After the sealing polymer is cooled sufficiently for it to have structural integrity, the unitized MEA, shown in FIGS. 5 and 6 was removed from the tool. As can be clearly seen the unitized MEA (30) comprises the MEA sandwich (11) and an integral seal (14). The unitized MEA may also be cooled to lower temperatures if necessary, for example to reduce warpage.

Ridges, ribs and other features (not shown) may be provided on the seal by having recesses in the plunger area adjacent the seal.

An example of a well-known industrial process of compression molding was the production of phonograph records, which were typically made from compounded polyvinyl chloride. An example of such a process is described in *Principles of Polymer Systems, 2nd Ed.*, Ferdinand Rodriguez, McGraw-Hill, New York, 1982.

Fuel Cell

The unitized MEA (30) may be used to assemble a fuel cell. Bipolar plates (not shown) are positioned on the outer surfaces of the first and second (cathode and anode) gas diffusion backings having sealing edges (13) and (13'). If the seals (14) and (14') are provided with ridges, domes, ribs, or other structural features (not shown), the bipolar plates may be provided with recesses that mesh with these features on the seals (14) and (14').

Several fuel cells may be connected together, typically in series, to increase the overall voltage of the assembly. This assembly is typically known as a fuel cell stack.

Use of the mold having a low conductivity insert and manufacture of the unitized MEA of the invention will be further clarified with reference to the following examples. The examples are merely illustrative and are not intended to limit the scope of the invention.

EXAMPLES

Control 1

A picture-frame mold was fabricated of tool steel, having an American Iron and Steel Institute (AISI) specification of H-13 heat treated to RC 40-44, and manufactured by Carpenter Technology Corporation, Reading, Pa. The mold consisted of three parts—a frame with 7.6-cm-square hole, a 0.95-cm-thick 7.6-cm-square bottom plunger, and a 4.1-cm-thick, 7.6-cm-diameter square top plunger. A hole was drilled into one side of the frame where a thermocouple was inserted for the purpose of reading the mold temperature at this interface. Steel shims having an equal thickness are placed on opposite sides of the frame between the frame and the top plunger to limit the amount of compression in the MEA.

A three-layer sandwich comprising 0.2-mm-thick Nafion® 117, DuPont, Wilmington, Del., between two layers of a carbon-fiber-based diffusion backing, SGL "Sigracet" GDL 10AA, manufactured by SGL Carbon Group, Mannheim, Germany, was placed in the center of the bottom plunger atop a 0.08-mm-thick PTFE release film, with the frame part around it. This sandwich was in essence a "dummy" MEA, in that it lacked the electrocatalysts necessary for fuel cell function, but could serve mechanically and electrically to work in the same way.

The membrane had been cut to be about 7 mm larger than the diffusion backings. Several layers of thermoplastic polymer film, Bynel® 40E529 polyethylene-containing seal material, manufactured by DuPont, Wilmington, Del., were die-cut to square dimensions of 7.6 cm outside diameter and 5.1 cm inside diameter; the films thus formed frames that would surround the diffusion backings but partly overlap the extended portion of the membrane all around its perimeter. These layers of sealing polymer were also placed in the mold, above and below the membrane. A second piece of the release film was placed on top of the sandwich.

The top plunger of the tool was put in place, fitted into the frame. The tool with the materials within was placed in a press, allowed to heat to above the melting point of the thermoplastic polymer, compressed hydraulically and cooled in place. Just before cooling, the temperature in the frame was measured to be approximately 185° C., and the set point for the press-platens temperature was 200° C. After the frame temperature was below 60° C., the part was removed from the tool.

The sandwich components were held together by the consolidated thermoplastic polymer seal thus formed. Further, the MEA sandwich was fully encapsulated at its edges; the edge of the membrane was not visible around any of the specimen. The sealing polymer was able to contact and slightly ingress into both of the diffusion backing layers all around their perimeters. However, the product specimen was significantly warped, and the central part of the membrane appeared rippled and was found to be dark in color, indicating it had been overheated.

Example 1

Control 1 was repeated with the following exception: the top and bottom plungers of the tool were modified so only the areas contacting the Bynel® 40E529 polyethylene-containing seal material, manufactured by DuPont, Wilmington, Del., were steel. The inner square area adjacent the gas diffusion backings, were made of a low-thermal-conductivity ceramic Cotronics 914 machinable glass ceramic, manufactured Cotronics Corporation, Brooklyn, N.Y., and the inner surface of this ceramic was maintained at a much lower temperature than the steel portion throughout the molding process. Further, the molding temperature was reduced; the set point temperature was maintained at 145° C. and the maximum frame temperature was maintained at 137° C.

The specimen thus made was fully encapsulated, and the central part of the membrane was smooth and flat, showing no ripples. However, the specimen was still somewhat warped indicating that depending on the components of the sandwich the mass of the top and bottom plungers may have to adjusted to avoid warping of the unitized MEA formed.

Example 2

Example 1 was repeated with the following exception: the tooling was modified such that the top and bottom plungers of the tool were the same thickness, 4.1 cm, and mass. The frame was suspended high enough, using shims, such that its midpoint was near the midpoint of the MEA materials.

The specimen thus made was fully encapsulated, and was not warped, and the central part of the membrane was smooth and flat, showing no ripples.

Example 3

Example 2 was repeated with the following exception: the bottom plunger was replaced with an unmodified plunger containing no ceramic material.

The specimen thus made was fully encapsulated, but exhibited minor warping, and the central part of the membrane was smooth and flat, showing no ripples.

Example 4

Example 2 was repeated with the following exception: instead of a 0.2-mm-thick Nafion® membrane, a 0.05-mm-thick membrane coated on both sides with a platinum-based catalyst layer was used. This catalyst-coated membrane (CCM) was designed for use in a PEM fuel cell.

The specimen thus made was placed in a hydrogen-fueled test fuel cell and found to generate electric current. A polarization curve was generated for this specimen and found to match that of a similar CCM assembled into a similar cell with traditional gaskets and separate diffusion backings.

What is claimed is:

1. A process of preparing a unitized membrane electrode assembly using compression molding comprising:
    (a) forming a multilayer sandwich comprising a first gas diffusion backing having sealing edges; a first electrocatalyst coating composition; a polymer membrane; a second electrocatalyst coating composition; and a second gas diffusion backing having sealing edges; and
    (b) compression molding a sealing polymer to the multilayer sandwich, wherein the mold used in the compression molding apparatus comprises:
    (c) a frame part with a hole through its center;
    (d) a bottom plunger; and
    (e) a top plunger; wherein the plungers are fabricated to fit substantially snuggly in the hole in the frame part, and wherein at least one plunger comprises at least one low-thermal conductivity insert;
whereby the sealing polymer is impregnated into at least a portion of the sealing edges of the first and second gas diffusion backings, and the thermoplastic polymer envelops a peripheral region of both the first and second gas diffusion backings and the polymer membrane to form a thermoplastic polymer, fluid impermeable seal.

2. The process of claim 1 wherein the at least one low-thermal conductivity insert is present in the top plunger and the bottom plunger.

3. The process of claim 1 wherein the plunger comprises a plurality of low-thermal conductivity inserts.

4. The process of claim 3 wherein the at least one low-thermal conductivity insert is a ceramic.

5. The process of claim 4 wherein the ceramic is selected from the group consisting of alumina, alumina silicate, glass, zirconia, and boron nitride.

6. The process of claim 1 wherein the at least one low-thermal conductivity insert is bonded to the at least one plunger with an adhesive.

7. The process of claim 6 wherein the adhesive is a fast cure adhesive.

8. The process of claim 1 wherein the first and second electrocatalyst coating composition are coated on opposite sides of the polymer membrane to form a catalyst-coated membrane.

9. The process of claim 1 wherein membrane and the first and second gas diffusion backings having sealing edges are all the same size.

10. The process of claim 8 wherein the catalyst coated membrane and the first and second gas diffusion backings having sealing edges are all the same size.

11. The process of claim 1 wherein the membrane is longer than the first and second gas diffusion backings having sealing edges.

12. The process of claim 8 wherein the catalyst coated membrane is longer than the first and second gas diffusion backings having sealing edges.

13. The process of claim 8 wherein the sealing polymer comprises a thermoplastic polymer.

14. The process of claim 8 wherein the sealing polymer comprises a thermosetting or curable-resin polymer.

* * * * *